(12) United States Patent
Mori (10) Patent No.: US 7,010,567 B1
(45) Date of Patent: Mar. 7, 2006

(54) MAP-DATA DISTRIBUTION METHOD, AND MAP-DATA DISTRIBUTION SERVER AND CLIENT

(75) Inventor: Daishi Mori, Tokyo (JP)

(73) Assignee: Alpine Electronic, Inc., Iwaki (JP)

( * ) Notice: Subject to any disclaimer, the term of this patent is extended or adjusted under 35 U.S.C. 154(b) by 789 days.

(21) Appl. No.: 09/642,739

(22) Filed: Aug. 18, 2000

(30) Foreign Application Priority Data

Jun. 7, 2000 (JP) .............................. 2000-170290

(51) Int. Cl.
*G06F 15/16* (2006.01)
*G06F 19/00* (2006.01)
*G09G 5/00* (2006.01)
*G08G 1/123* (2006.01)
*G01C 21/30* (2006.01)

(52) U.S. Cl. ...................... 709/203; 709/219; 709/231; 345/637; 340/995.18; 701/208; 702/5

(58) Field of Classification Search ................ 709/201, 709/203, 231; 707/102; 702/5; 340/988–996; 345/629, 637; 701/208
See application file for complete search history.

(56) References Cited

U.S. PATENT DOCUMENTS

| | | | |
|---|---|---|---|
| 5,682,525 A | | 10/1997 | Bouve et al. |
| 5,848,373 A | * | 12/1998 | DeLorme et al. ............ 701/200 |
| 6,311,221 B1 | * | 10/2001 | Raz et al. .................... 709/231 |
| 6,577,714 B1 | * | 6/2003 | Darcie et al. ............ 379/93.17 |
| 6,757,717 B1 | * | 6/2004 | Goldstein .................... 709/217 |

* cited by examiner

*Primary Examiner*—Saleh Najjar
*Assistant Examiner*—David Lazaro
(74) *Attorney, Agent, or Firm*—Brinks Hofer Gilson & Lione (57) ABSTRACT

A map-data distribution method distributes map data from a map-data distribution server to a client and causes the client to draw a map image. The map-data distribution method includes steps of causing the map-data distribution server to store a plurality of map components obtained by dividing the map data, causing the server to send the map data to the client in an order according to the map component, and causing the client to store the received data in a temporary memory while causing the client to start to draw the map image using one of the received data and the data stored in the temporary memory.

18 Claims, 7 Drawing Sheets

MAP-DATA DISTRIBUTION METHOD, AND MAP-DATA DISTRIBUTION SERVER AND CLIENT

BACKGROUND OF THE INVENTION

1. Field of the Invention

The present invention relates to a map-data distribution method in which a server sends map data to a client via a communication line and the client draws a map image based on the received map data, and relates to the client and the map distribution server using the same.

2. Description of the Related Art

Recently, electronic map data has been available on the World-Wide Web ("WWW"). For example, when a user accesses a web site providing electronic map data and specifies a desired location by inputting the latitude and the longitude thereof, a map image including the desired location is transmitted via the Internet to the user's computer (hereinafter referred to as the client) and is shown on a display of the computer.

Generally, a server at the web site providing the electronic map stores map data in a vector format. Therefore, when the client requests that the server transmit an electronic map, the server retrieves the map data including the desired location from a map database, draws a bitmap image by rendering the retrieved map data, and transmits the drawn image in the JPEG (Joint Photographic Experts Group) format, the GIF (Graphics Interexchange Format), or the like to the client.

When a segment of the map image is transmitted via a communication line using the above-described conventional map-data distribution method, the performance of the client computer and the quality of the communication line are not considered. Since the size of the map image tends to be large, transmission of the map image requires a long time.

In order to reduce the size of the transmitted map image, an alternative method can be considered in which the server transmits unmodified map data (i.e., plain vector data) to the client and the client renders the map data. Although this method can reduce the communication time between the server and the client, since the performance of the client computer is generally less than that of the server computer, the client must spend a great amount of time drawing the map image based on the vector map data.

SUMMARY OF THE INVENTION

Accordingly, it is an object of the present invention to provide a map-data distribution method which enables the communication time between a server and a client to be reduced and which enables the client to draw a map image in a relatively short period from the beginning of the communication, and the client and the map-data distribution server using the map-data distribution method.

To this end, according to a first aspect of the present invention, there is provided a map-data distribution method for distributing map data from a map-data distribution server to a client and causing the client to draw a map. The map-data distribution method comprises the steps of causing the map-data distribution server to store a plurality of map components obtained by dividing the map data, causing the server to send the map data to the client in an order according to the map component, and causing the client to store the received data in a temporary memory while causing the client to start to draw the map using one of the received data and the data stored in the temporary memory.

According to a second aspect of the present invention, a map-data distribution server retrieves a map component from a map database in accordance with a requested order, by a client, according to the map component and sends the retrieved map component via a communication line to the client.

According to a third aspect of the present invention, a client includes a user interface thread for outputting a map-drawing request, a main thread for accessing a map-data distribution server in accordance with the map-drawing request output from the user interface thread and for receiving map data in an order according to a map component, and a drawing thread for drawing a map using the received map data.

In the map-data distribution server, the map data is stored according to the map component such as road data for drawing a road, polygon data for drawing a construction, and character string data for drawing a character string. The map data is sent to the client in an order according to the map component. In the present invention, the client does not wait for the entirety of map data to be received. Instead, when the client starts to receive the data, it stores the received data in a temporary memory and starts to draw a map image using the received data or the data stored in the temporary memory.

In the present invention, instead of sending the map image, the server sends, to the client, map data, which is data for drawing a map image. Accordingly, since the amount of transmission data is reduced, communication time is also reduced. Furthermore, since the client causes map-data receiving processing and map-data drawing processing to be performed in parallel, the map-data drawing processing can be completed earlier than in a case in which the entirety of map data is received and then map-data drawing processing is started. In addition, in the present invention, the map data is received according to the map component. For example, road images are drawn first, and then the names of the roads, building images, the shapes of parks, and the like are drawn. Therefore, since map-image drawing is performed starting from major map components, the substantial outline of a desired location can be grasped to some extent before the entirety of the map image is drawn.

Further features and advantages of the present invention will become apparent from the following description of the preferred embodiments with reference to the drawings.

DESCRIPTION OF THE PREFERRED EMBODIMENTS

Hereinafter, the embodiments of the present invention are described with reference to the drawings.

First Embodiment

Figure 1:
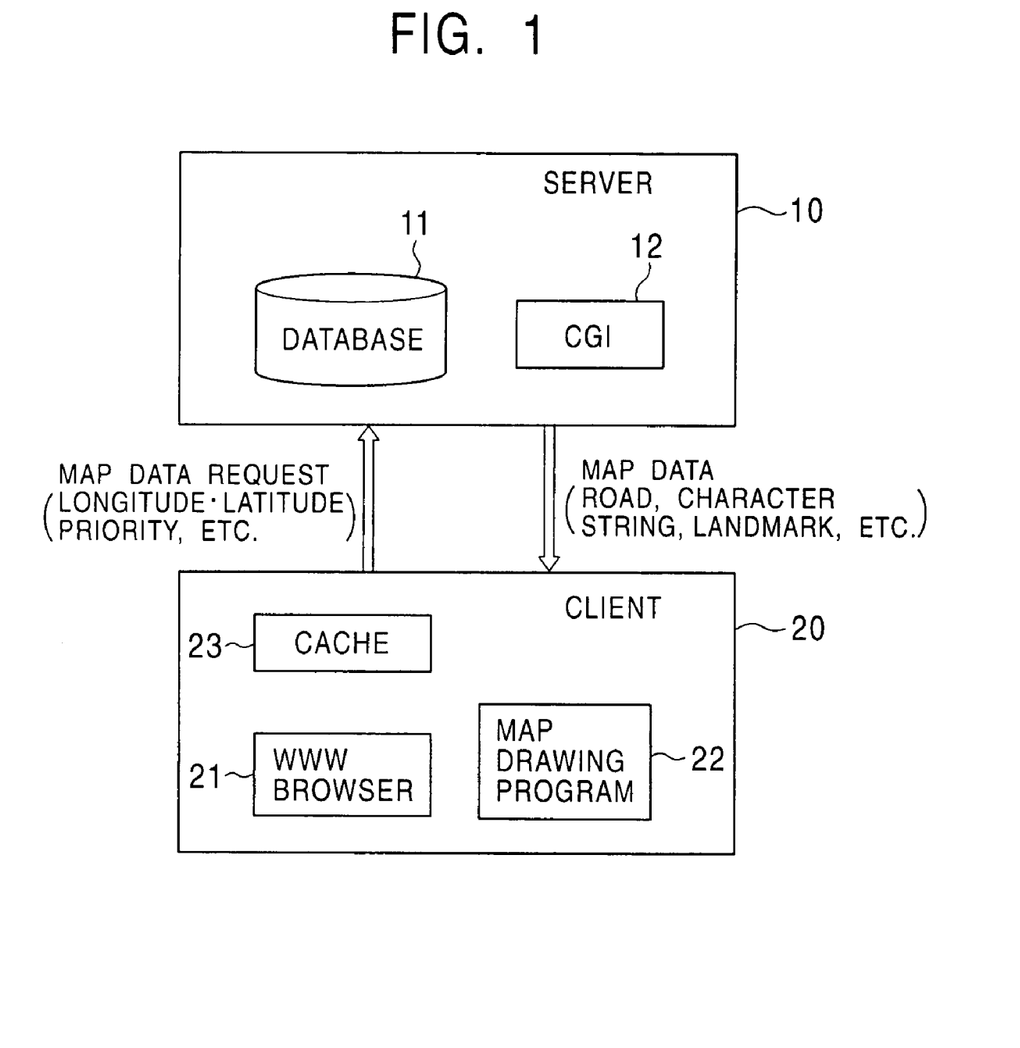
FIG. 1 is a block diagram showing the construction of a system for realizing a map-data distribution method according to a first embodiment of the invention.

FIG. 1 shows the construction of a system for realizing a map-data distribution method according to the first embodiment of the invention. The system includes a map-data distribution server 10 and a client 20 which are connected via a communication line such as the Internet.

The map-data distribution server 10 includes a map database 11 for storing map data therein and a CGI (Common Gateway Interface) 12 for extracting predetermined image data from the map database 11.

Map data stored in the map database 11 is divided into segments, each of which has an appropriate range of longitudes and an appropriate range of latitudes in accordance with a map scale such as 1:12500, 1:25000, 1:50000, or 1:100000. For example, roads are represented by links among a plurality of nodes (vertexes) and are stored as a set of the nodes represented by the longitudes and the latitudes of the corresponding nodes. The map data includes the following data: (1) road data used for drawing road images and including the positions of nodes and the states of links; (2) polygon data used for drawing polygon images such as buildings, facilities, parks, rivers, and the like; (3) character string data for displaying the names of administrative districts such as the names of cities, the names of towns, and the like; (4) landmark data for displaying landmark building images, landmark shop images, and the like; and (5) altitude data used for displaying contour lines and the like.

The client 20 includes a WWW browser 21 for accessing a web site on the server 10, a map drawing program 22 for drawing a map image on a display unit while cooperating with the WWW browser 21, and a cache (temporary storage memory) 23 for temporarily storing the map data transmitted from the server 10. The map drawing program 22 is implemented, for example, as a Java applet, by Active X, or as a plug-in program. The cache 23 is realized using an unused region of a semiconductor memory (DRAM: Dynamic Random Access Memory) or an unused region of a hard disk drive.

Figure 2:
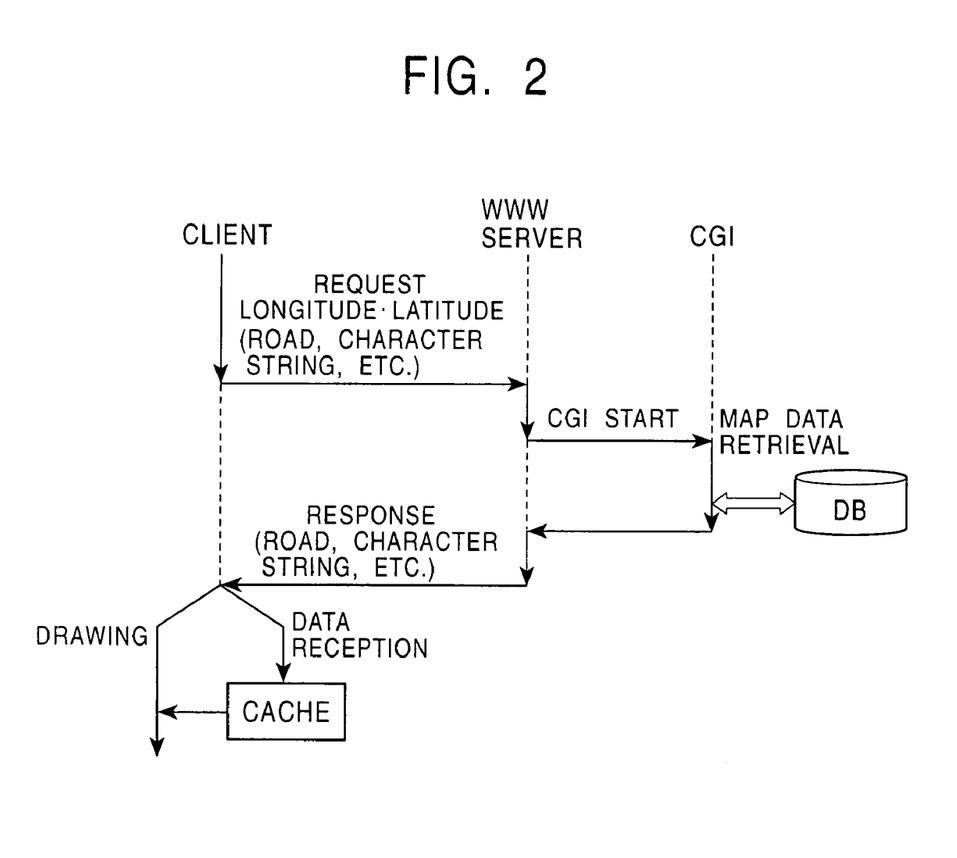
FIG. 2 is a diagram showing the map-data distribution method according to the first embodiment of the invention.

FIG. 2 shows the map-data distribution method according to the present embodiment of the invention.

The client 20 accesses the web site providing the electronic map distribution service via a communication line such as the Internet using the WWW browser 21. A user specifies a desired location by applying a predetermined operation. Various methods for specifying the desired location can be considered, such as a method in which the client 20 initially displays a wide-area map on the display and the user specifies the desired location from the wide-area map, or a method in which the user specifies the desired location by the place name such as the name of a state, a prefecture, a city, a town, a village, or a station. In the present embodiment, the user directly inputs the latitude and the longitude of the desired location.

When the user inputs the latitude and the longitude of the desired location to the client 20, the client 20 transmits a map-data request and the input latitude and longitude to the server 10. At this time, the user can specify the order of priority of the data to be transmitted from the server 10. Here, the user is assumed to specify the order of priority of the transmission data as follows: the road data, the character string data, the landmark data, the polygon data, etc. Alternatively, the order of priority of the transmission data is initialized and then the user can arbitrarily change it.

When the server 10 receives the map-data request from the client 20, the server 10 starts the CGI 12. The CGI 12 retrieves the map data including the desired location from the map database 11. The server 10 transmits, to the client 20, the map data retrieved by the CGI 12 in the specified order of priority.

The client 20 does not wait for the entire map data to be transmitted from the server 10 before starting to draw the map image. What the client 20 actually does is to receive the map data while simultaneously drawing the map image based on the received map data. That is, the client 20 stores the data transmitted from the server 10 in the cache 23 while starting the map drawing program 22 and causing it to draw the map image based on the map data transmitted from the server 10 or the map data stored in the cache 23.

In the present embodiment, since the server 10 transmits the data in the order of the road data, the character string data, the landmark data, the polygon data, etc., the client 20 initially receives the road data and then draws road images. When the character string data, the landmark data, and the like are received before the road drawing processing is completed, these data are stored in the cache 23. When the cache 23 is out of memory, the program 22 discards data already used for drawing, data referenced less frequently, or data having lower priority from among the road data stored in the cache 23.

When the road drawing processing is completed, character string drawing processing, landmark drawing processing, and the like are performed in turn. Thus, the map image is shown on a screen of the client 20.

In the present embodiment, since the client 20 starts to draw the map image right after the server 10 starts to transmit the road data, less time is required to draw the map image compared to a case in which all the map data is received and then the map image starts to be drawn. Furthermore, since, in the present embodiment, the road drawing processing, the character string drawing processing, and the landmark drawing processing are performed in this order, the desired location and its surroundings can be recognized to some extent before the entirety of the map image is drawn.

In addition, for example, when the user changes a display region of the map image by scrolling the map image upwardly, downwardly, to the left, or to the right, by switching the map image between the wide area map and the detailed map, or the like before the entirety of a segment of the map data is received from the server 10, the client 20 cancels the map data reception and requests that the server 10 transmit new map data. When the cache 23 has this new map data therein, the client 20 transmits a signal which lets the server 10 know that there is no need to transmit this new map data to the client 20. Accordingly, the server 10 can avoid transmitting duplicated data and transmits only necessary data.

Thus, the present embodiment excludes, as much as possible, the time lag up to when the entirety of the map image is displayed by causing the server 10 to avoid transmitting unnecessary data. The longer the time lag between application of an operation and response to the operation becomes, the more restless the user is likely to feel. However, the present embodiment can reduce this time lag and can improve the usability of the system. Furthermore, since data transfer is performed for the map component unit constituting a segment of the map data and not for the segment of the map component having a certain amount of image data, the client 20 can finely control the transferred data. Accordingly, the communication and the map drawing processing can be more efficiently performed.

Second Embodiment

Figure 3:
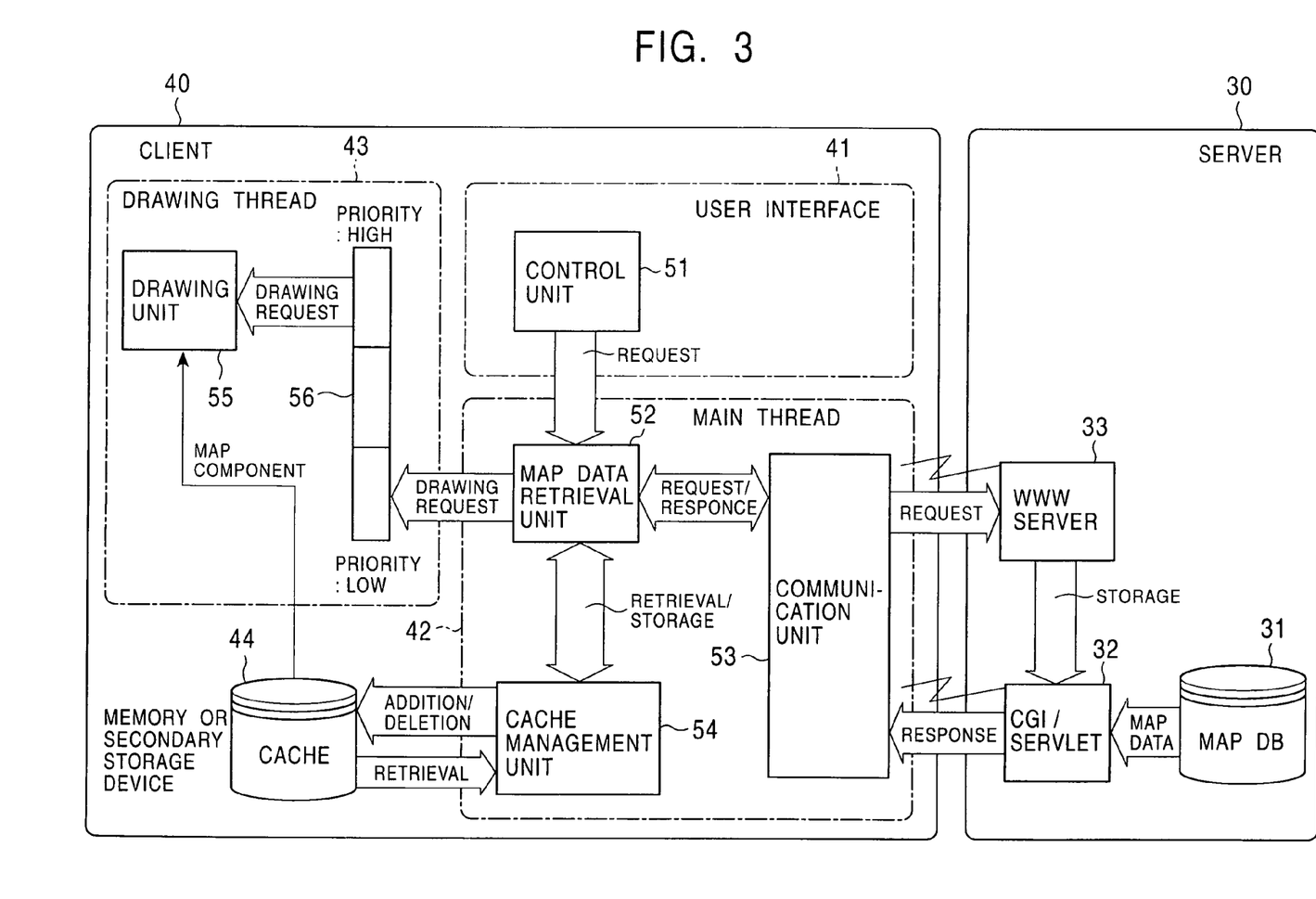
FIG. 3 is a block diagram showing the construction of a system for realizing a map-data distribution method according to a second embodiment of the invention.

FIG. 3 shows the construction of a system for realizing a map-data distribution method according to the second embodiment of the invention. The system includes a map-data distribution server 30 and a client 40.

The map-data distribution server 30 includes a map database (DB) 31 for storing the map data therein, a CGI or a Servlet 32 (referred to as the CGI/Servlet 32) for extracting predetermined map data from the map database 31, and a WWW server 33. In the same manner as in the first embodiment, the map database 31 contains the map data which are classified by the map components such as the road data, the polygon data, the character string data, and the landmark data in accordance with the map scales. The WWW server 33 can be accessed from the Internet and provides the web site. Accordingly, the client 40 can easily access the map-data distribution server 30 using a web browser.

The CGI/Servlet 32 is activated in accordance with a request from the client 40 which accesses the server 30. The CGI/Servlet 32 retrieves, from the map database 31, map data having the desired location and the desired map scale requested from the client 40 and transmits, to the client 40, the map components of the retrieved map data in the requested order.

The client 40 is a general-purpose computer, which for example, reads a specific program and executes the program. As the configuration of hardware, the client 40 includes a CPU (Central Processing Unit), a main memory (primary storage unit such as a DRAM), a video memory for drawing images, a secondary storage unit (such as a hard disk drive), an input unit (such as a keyboard or a mouse), a communication unit (such as a modem, a router, or a terminal adapter), and a display unit (such as a CRT (cathode ray tube) or an LCD (Liquid Crystal Display)). However, the client 40 is not necessarily a general-purpose computer and it may be an electronic device (communication terminal) using computer technology such as a car navigation device or a PDA (Personal Digital Assistant). When these devices are used as the client 40, they access the Internet via, for example, a line for a portable telephone.

As the configuration of software, the client 40 includes three threads, namely, a user-interface thread 41, a main thread 42, and a drawing thread 43. By causing these three threads to cooperate with one another, user input processing, map-data retrieval processing, and map-image drawing processing are performed in parallel. Thus, the time between user input and the beginning of map-image drawing (or display content changing) can be minimized.

The user interface thread 41 includes a control unit 51. The main thread 42 includes a map-data retrieval unit 52, a communication unit 53, and a cache management unit 54. The drawing thread 43 includes a drawing unit 55 and a drawing queue 56. A cache 44 for temporarily storing the map data received from the server 30 is configured using a part of the primary storage unit or a part of the secondary storage unit. In the present embodiment, the cache 44 has a capacity to store nine screens of data. The map image currently displayed on the screen is stored in the middle of the cache 44. Hence, the map image can be smoothly scrolled.

The control unit 51 of the user interface thread 41 interprets the input from the keyboard, the mouse or the like and sends a request based on the interpreted input. For example, when the user moves a cursor to a predetermined position of the screen and inputs the latitude and longitude of a desired location, the control unit 51 sends, to the main thread 42, a drawing request for a map image having the input latitude and longitude. Alternatively, for example, when the user clicks on a scroll button displayed on the screen, the control unit 51 sends a scroll request to the main thread 42. Here, a request sent from the user interface thread 41 may be referred to as a parameter. The parameter contains items such as (i) the latitude and longitude, (ii) the map scale, (iii) the type of a map component (the road data, the character string data, construction-polygon data (buildings, etc.), other-polygon data (parks, rivers, seas, etc.), the landmark data, and the like), and (iv) the order of priority of the map components (the drawing order). When the user requests map data having a new location or requests a change of the map scale, the control unit 51 sends this parameter to the main thread 42. Although the order of priority of the map components are initialized, for example, as follows in descending order of priority: the road data, the construction-polygon data, the other-polygon data, the character string data, and the landmark data, the user can change the order of priority. After sending the parameter to the main thread 42, the user interface thread 41 waits for another input from the user.

The communication unit 53 of the main thread 42 controls the communication device such as the modem, the router, and the terminal adapter so as to access the server 30, and transmit, to the server 30, the map-data request for each map component which is sent from the map-data retrieval unit 52. Furthermore, the communication unit 53 receives map data for each map component, which is transmitted from the server 30, and sends it to the map-data retrieval unit 52.

The cache management unit 54 manages the map components stored in the cache 44. For example, the cache management unit 54 has information about the map scale, the type of each map component, and the address of each map component in the cache 44, thereby facilitating retrieval of the map data stored in the cache 44. Moreover, the cache management unit 54 adds a map component, transmitted from the server 30, to the cache 44 and deletes a map component stored in the cache 44.

Figure 4:
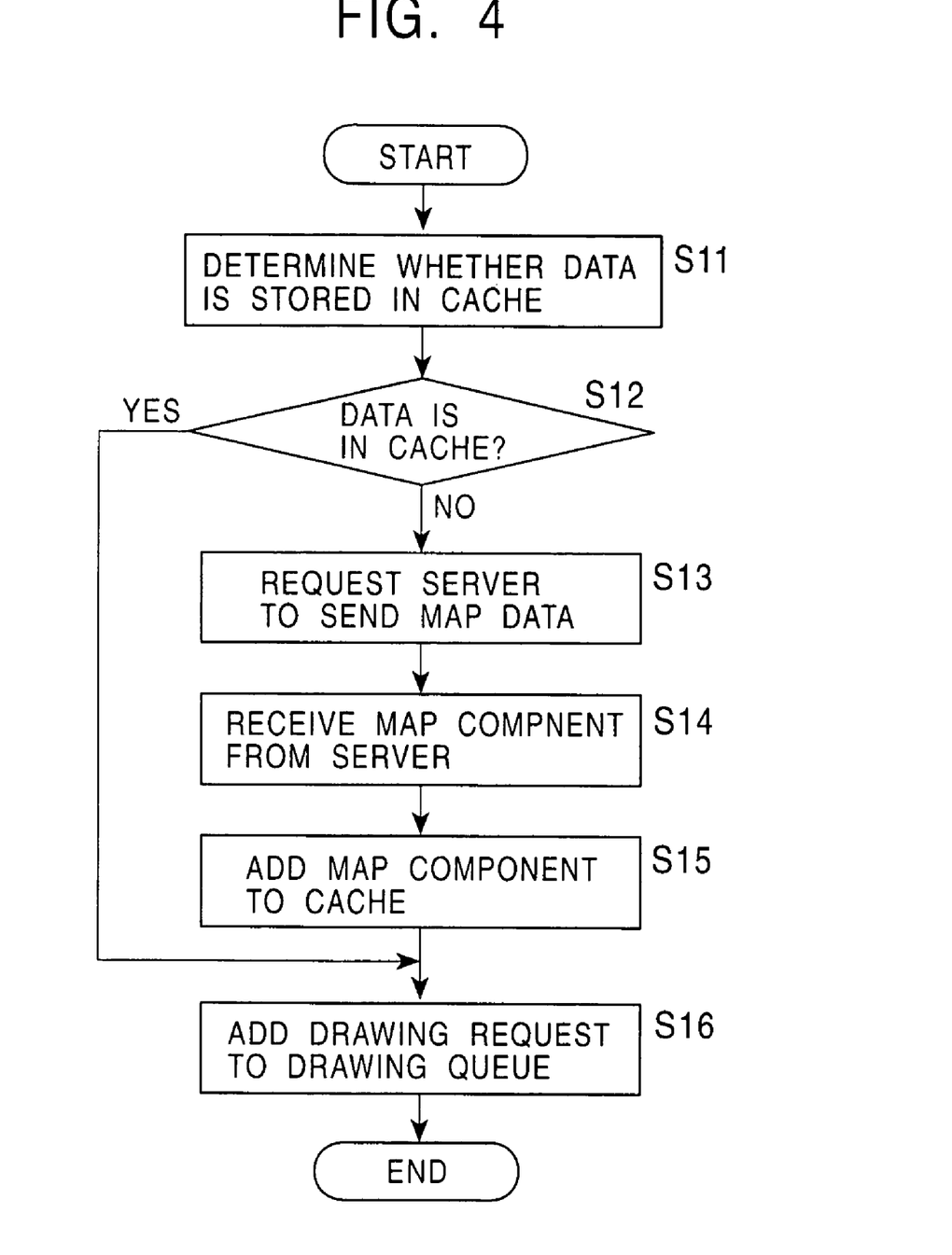
FIG. 4 is a flowchart illustrating the operation of a map-data retrieval unit according to the second embodiment of the invention.

The map-data retrieval unit 52 receives the parameter from the user interface thread 41, and performs map-data retrieval processing on the map components in descending order of priority in accordance with the flowchart shown in FIG. 4. At step S11, the process determines, using the cache management unit 54, whether a map component is stored in the cache 44. If the result of the determination is affirmative, the process proceeds from step S12 to step S16, otherwise the process proceeds from step S12 to step S13.

At step S13, the process requests the server 30 to transmit map data (the map component) via the communication unit 53. At step S14, the transmitted map component is received. At step S15, the process causes the cache management unit 54 to store the received map component in the cache 44. When the cache 44 is out of memory, an empty region for storing this new map component therein is secured by deleting some map components stored therein. Various methods for determining which map component is to be deleted can be considered. Among the methods, for example, there is a method in which the cache management unit 54 has information about the frequency of reference for each map component and secures an empty region by deleting a map component which is referenced less frequently, or a method in which the cache management unit 54 manages map components by linking a map component when the component is used, and secures an empty region by deleting a map component that does not link to the currently displayed map image. When a map image to the right of the currently displayed map image is shown by being scrolled, an empty region may be secured by deleting the map components of the map image to the left of the currently displayed one.

After the new map component is stored in the cache 44 in the above-described manner, the process proceeds to step S16. At step S16, the process adds the drawing request for this map component to the drawing queue 56.

The drawing queue 56 stores the drawing request for each map component. The drawing request is one of the following commands and data addresses in accordance with the type of the map component:

(i) A command for drawing road images displayed on the screen and the data address of the road data stored in the cache 44.

(ii) A command for drawing character-strings displayed on the screen and the data address of the character string data stored in the cache 44.

(iii) A command for drawing construction-polygon images displayed on the screen and the data address of the construction-polygon data stored in the cache 44.

(iv) A command for drawing other-polygon images displayed on the screen and the data address of the other-polygon data stored in the cache 44.

(v) A command for drawing landmark images displayed on the screen and the data address of the landmark data stored in the cache 44.

When sufficient memory is allocated for the drawing queue 56, the drawing queue 56 can store commands as well as the corresponding data (the corresponding map component) therein. However, in the present embodiment, the commands and the addresses to the corresponding data are stored in the drawing queue 56.

The drawing unit 55 draws the map image in accordance with the drawing requests of the drawing queue 56 in the stored order. For example, the drawing queue 56 is assumed to have drawing requests in the following order, namely, the road drawing requests, the construction-polygon drawing requests, the other-polygon drawing requests, the character string drawing requests, and the landmark drawing requests. At first, the drawing unit 55 reads road data from the cache 44 and draws the road images on the map image by expanding the road data in the video memory. Next, the drawing unit 55 reads construction-polygon data from the cache 44 and draws the building images and the like by expanding the polygon data in the video memory. Subsequently, the drawing unit 55 reads other-polygon data from the cache 44 and draws the images of the parks, the rivers, the seas, and the like by expanding the other-polygon data in the video memory. After that, the drawing unit 55 reads character string data from the cache 44 and draws the character strings. Finally, the drawing unit 55 reads landmark data from the cache 44 and draws the landmark images.

After being processed, the drawing request is discarded from the drawing queue 56. The drawing unit 55 repeats the above-described processing until the drawing queue 56 becomes empty. Since the main thread 42 sorts the drawing requests in the drawing queue 56 so that the drawing requests are arranged in descending order of priority, the drawing thread 43 draws map components in descending order of priority.

Figure 5:
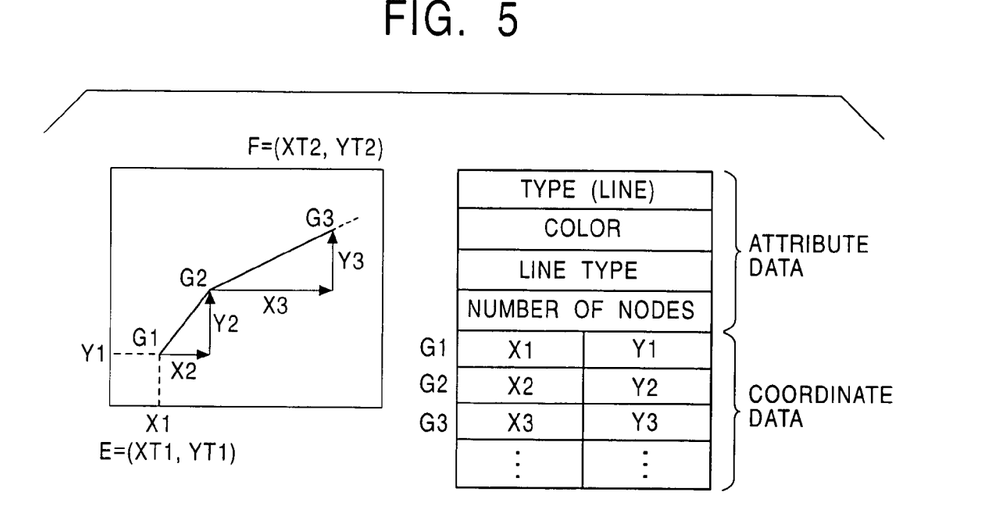
FIG. 5 consists of illustrations showing the data structure of road data.

FIGS. 5 to 8 show the data structure of each map component (the road data, the polygon data, the character string data, and the landmark data). The map components are divided into segments having an appropriate range of latitudes and of longitudes. The bounds of the segment are defined using the absolute longitude and latitude coordinates (XT1, YT1) and (XT2, YT2) of diagonal vertices E and F. As shown in FIG. 5, the road data is represented by a set of a plurality of nodes. The road data is divided into attribute data and coordinate data. As attribute data, the road data includes a type (line), a color, a line-type (a solid line or a dashed line, and its line width), and the number of nodes. As coordinate data, the road data includes the relative coordinates of each of nodes G1, G2, G3, and so on.

Figure 6:
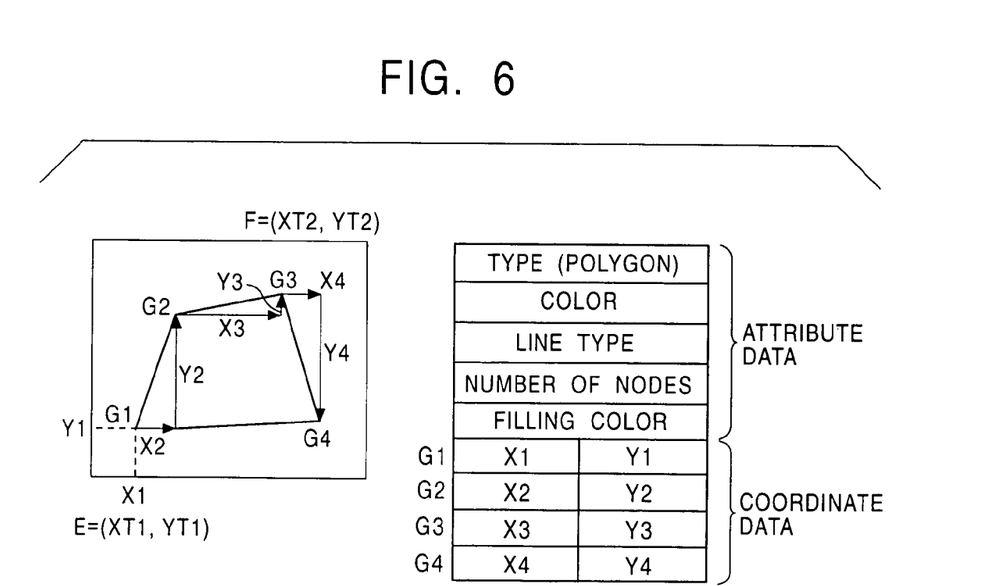
FIG. 6 consists of illustrations showing the data structure of polygon data.

As shown in FIG. 6, the construction-polygon data and the other-polygon data are also represented by a set of a plurality of nodes and are formed into a closed figure by connecting the end node (here, G4) and the start node (G1). As attribute data, the polygon data includes the type (polygon), the color of a line (contour), the line type (solid line or dashed line, and its line width), the number of nodes, and a filling color (the color inside the polygon). As coordinate data, the polygon data includes the relative coordinates of each node.

Figure 7:
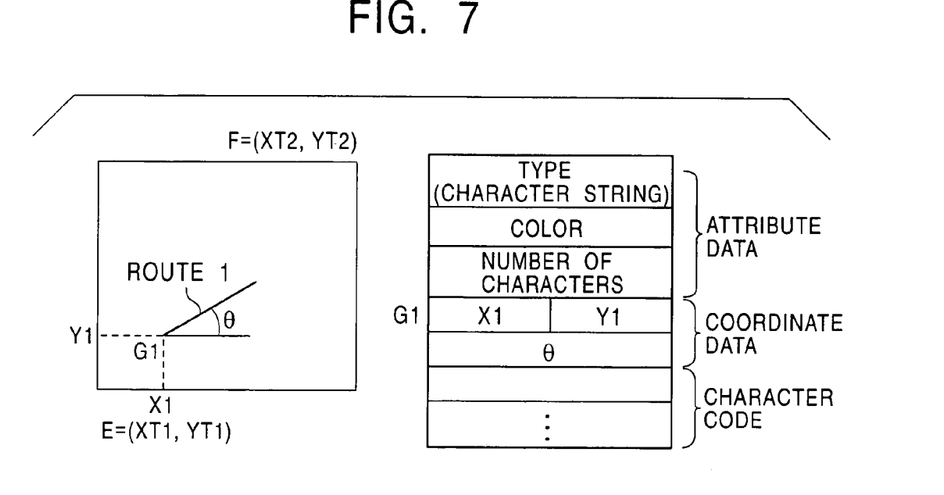
FIG. 7 consists of illustrations showing the data structure of character string data.

As shown in FIG. 7, the character string data includes, as attribute data, the type (character string), the color (the color of the character string), and the number of the characters of the character string. As coordinate data, the character string data includes the start position (G1) and the gradient of the character string. The character codes of the characters of the character string are stored after the coordinate data of the character string data.

Figure 8:
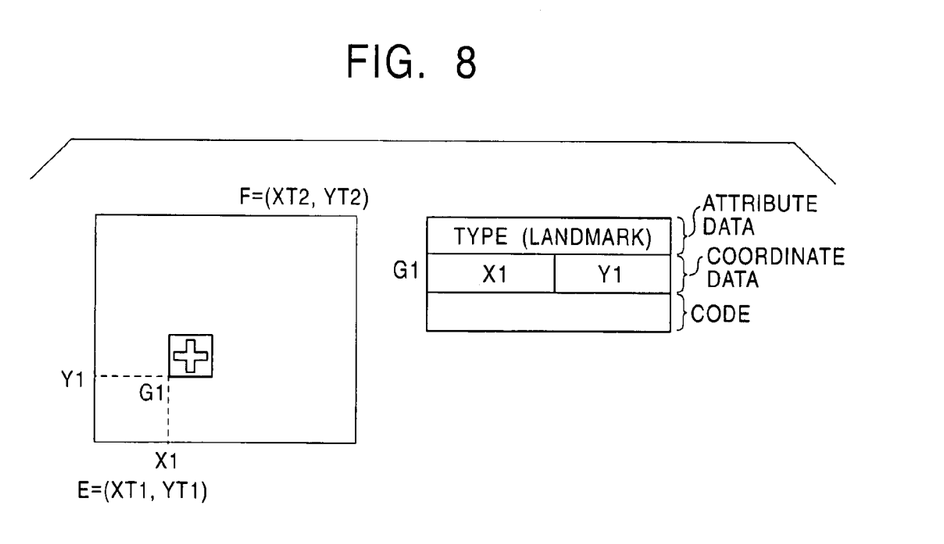
FIG. 8 consists of illustrations showing the data structure of landmark data.

As shown in FIG. 8, the landmark data includes the type (landmark) as attribute data. The landmark data includes the displayed position (G1) of the landmark as coordinate data and further includes a unique landmark code for the landmark. The landmark image (bitmap) may be transmitted from the server 30, or it may be provided in the client 40 beforehand.

The drawing unit 55 obtains each map component and draws the map image using it. When a sufficient capacity of video memory is provided, preferably, image data corresponding to nine screens of the display unit are expanded in the video memory, and the map image is shown on the display unit by clipping one screen of image data out of the expanded data. With this arrangement, the displayed map image can be smoothly scrolled. In a case in which the client 40 is an electronic device having a limited capacity of video memory, such as a PDA, image data corresponding to only one screen of the display unit is expanded in the video memory. Hence, whenever the map image is scrolled, another screen of image data is expanded in the video memory.

In the present embodiment, as described above, the user interface thread 41, the main thread 42, and the drawing thread 43 cooperate with one another, thereby performing user input processing, map-data retrieval processing, and map-image drawing processing in parallel. The map components such as the road data, the construction-polygon data, the other-polygon data, the character string data, and the landmark data are drawn in the requested order of priority and are shown on the display unit. Accordingly, the time between user input and display of the map image can be minimized, and usability of the system can be improved.

Third Embodiment

The third embodiment according to the present invention will now be described. The characteristic feature of the third embodiment is an operation of the map-data retrieval unit 52, and otherwise the basic construction of the present embodiment is identical to that of the second embodiment. Hence, the present embodiment is also described with reference to FIG. 3, and repeated descriptions are omitted.

In the second embodiment, the drawing unit 55 performs map-image drawing processing in accordance with the map components read from the cache 44 until the drawing queue 56 is empty. However, when a new location is input or when the map scale is changed, it is preferable that the map-image drawing processing, which is currently running, should be cancelled and it should be restarted using the new input data. To implement such an operation, the map-data retrieval unit 52 of the present embodiment performs processing in accordance with the flowchart shown in FIG. 9.

Figure 9:
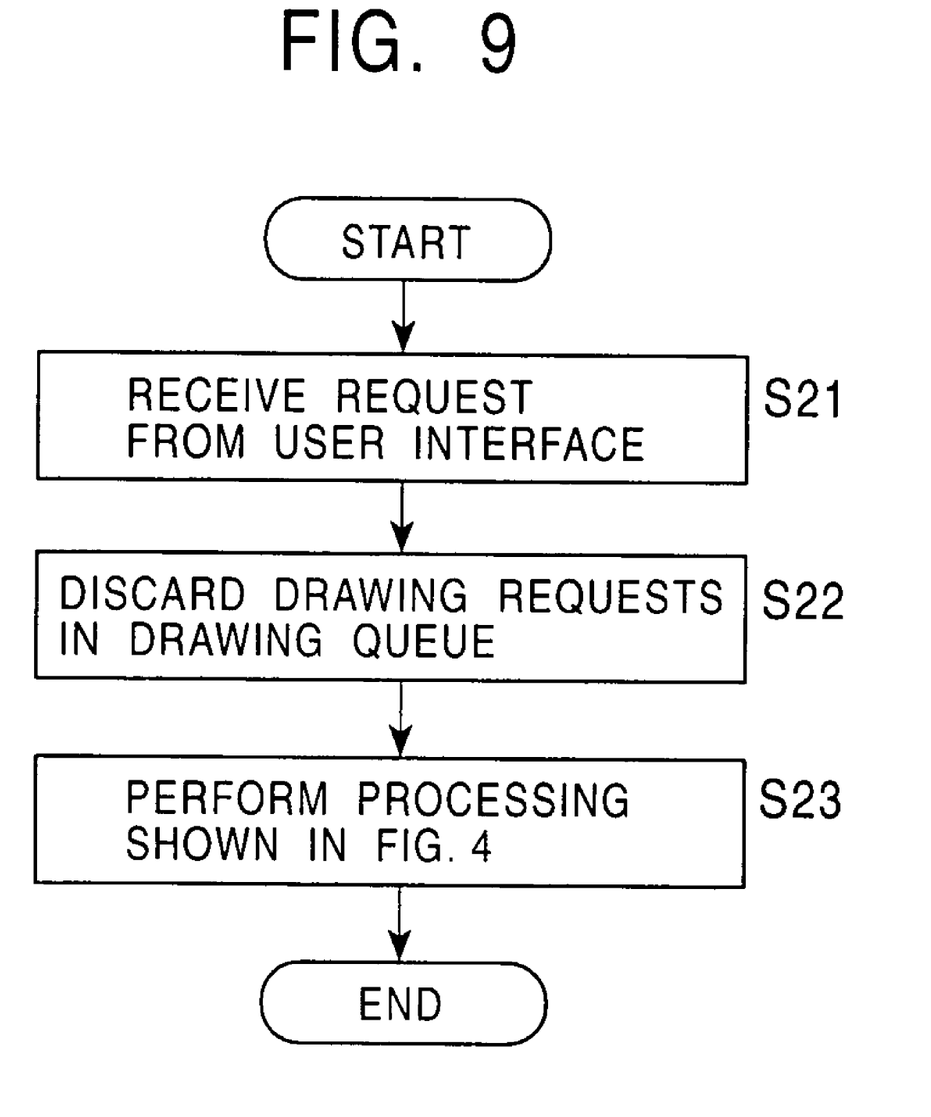
FIG. 9 is a flowchart illustrating an operation of a map-data retrieval unit according to a third embodiment of the invention.

At step S21, the process receives a map-data request or a map scale change request from the user interface thread 41 when the user inputs a new desired location or a new desired map scale. At step S22, the process discards the unprocessed drawing requests stored in the drawing queue 56. Since the drawing queue 56 becomes empty, the drawing unit 55 is suspended until a new drawing request is added to the drawing queue 56. At step S23, the map-data retrieval unit 52 performs the processing shown in FIG. 4 for each map component in descending order of priority.

In the present embodiment, when a map having the newly desired location is requested or when a change of the map scale is requested, the unprocessed drawing requests stored in the drawing queue 56 are discarded and then the new drawing request is added to the drawing queue 56. That is, when the change of the map scale or the map having the newly desired location is requested before every map component of the map image currently being drawn is drawn, currently running map-image processing is cancelled and a map having the newly desired location starts to be drawn. Therefore, the present embodiment enables response characteristics to be improved compared to the response characteristics obtained using the second embodiment.

In the above-described embodiments, the map data (the map components) are stored in the cache 23 or 44 (the temporary storage memory). Since the map data stored in the cache are discarded soon, when it is desired to re-use the map data after it has been discarded, the server must re-transmit the map data. To avoid the re-transmission, the map data may be stored not only in the cache but also in a nonvolatile storage device such as a hard disk drive.

What is claimed is:

1. A map-data distribution method for distributing map data from a map-data distribution server to a client and causing said client to draw a map image, said map-data distribution method comprising:

causing said map-data distribution server to store a plurality of map components obtained by dividing said map data, wherein said map data for drawing a map image is separated by type of data into a plurality of different map components which, when drawn and superimposed, constitute the map image;

causing the client to specify an order of priority of transmission of said map components and to transmit said order of priority to said server;

causing the server to serially send said map data, by map component, to said client in said order of priority received from said client; and causing said client to store the received map data in a temporary memory while causing said client to start to draw the first received map component of the map image using one of the received map data and the map data stored in said temporary memory before all map components of the map data are received by the client;

wherein said map components of said map data include at least one of a map component of road images appearing in the map image, a map component of polygon images appearing in the map image, a map component of names appearing in the map image, and a map component of landmark images appearing in the map image.

2. A map-data distribution method according to claim 1, wherein said map data includes, as said map components, road data for drawing a road, polygon data for drawing a construction, and character string data for drawing a character string.

3. A map-data distribution method according to claim 1, wherein when the map data is stored in said temporary memory, said client sends a signal to the server so that the server does not send the map data.

4. A map-data distribution method according to claim 1, wherein:

said client includes:

a user interface for outputting a map-drawing request based on interpretation of user input;

a main thread for accessing the server in accordance with said map-drawing request output from said user interface and for receiving the map components; and a drawing thread for drawing the map image; and said user interface, said main thread, and said drawing thread cooperate so that processing for input from the user, processing for retrieving the map data from the server, and processing for drawing the map image are performed in parallel.

5. A map-data distribution method according to claim 4, wherein said drawing thread includes a drawing queue for storing, according to the map component, a drawing request added by said main thread.

6. A map-data distribution method according to claim 5, wherein said drawing thread processes said drawing request stored in said drawing queue in order and deletes a processed drawing request from said drawing queue.

7. A map-data distribution method according to claim 5, wherein:

when said user interface sends said map-drawing request to said main thread, said main thread determines whether a map component related to said map-drawing request is stored in said temporary memory by searching the map components in descending order of priority;

when the map component is stored in said temporary memory, the drawing request for said map component is added to the drawing queue of said drawing thread;

when the map component is not stored in said temporary memory, the server is accessed via a communication line and is requested to send said map component, and then, when the server sends said map component, said map component is stored in said temporary memory while the drawing request for said map component is added to the drawing queue of said drawing thread; and said drawing thread draws the map image by processing said drawing request stored in said drawing queue in accordance with the added order.

8. A map-data distribution method according to claim 5, wherein said main thread discards unprocessed drawing requests stored in said drawing queue in accordance with a request from said user interface.

9. A map-data distribution method according to claim 5, wherein when new data is to be stored in said temporary memory, and no space is available for storing said new data in said temporary memory, discarding of data stored in said temporary memory is performed starting from data having the least frequency of use.

10. A map-data distribution method according to claim 5, wherein said temporary memory has a capacity sufficient to contain map data for a plurality of screens.

11. A map-data distribution method according to claim 5, wherein said drawing thread expands a plurality of screens of the map image in a video memory and causes one screen from among said plurality of screens of the map image to be displayed.

12. A map-data distribution server comprising:
retrieving means for retrieving map components from a map database in accordance with a requested order of priority of transmission, transmitted by a client to the server, according to the map component, wherein map data for drawing a map image is separated by type of data into a plurality of different map components which, when drawn and superimposed, constitute the map image; and
sending means for serially sending the retrieved map components in the requested order of priority via a communication line to said client so that said client can start to draw the first received map component of the map image before all map components of the map data are received by the client;
wherein said map components of said map data include at least one of a map component of road images appearing in the map image, a map component of polygon images appearing in the map image, a map component of names appearing in the map image, and a map component of landmark images appearing in the map image.

13. A map-data distribution server according to claim 12, wherein road data for drawing a road, polygon data for drawing a construction, and character string data for drawing a character string are included as said map components.

14. A client comprising:
a user interface for outputting a map-drawing request;
a main thread for accessing a map-data distribution server in accordance with said map-drawing request output from said user interface and for receiving components of map data in an order according to map component, wherein map data for drawing a map image is separated by type of data into a plurality of different map components which, when drawn and superimposed, constitute the map image, and the server provides the map components to the client serially in an order of priority of transmission specified by the client; and
a drawing thread for drawing a map image using said received map data, starting with the first received map component and before all map components of the map data are received by the client;
wherein said map components of said map data include at least one of a map component of road images appearing in the map image, a map component of polygon images appearing in the map image, a map component of names appearing in the map image, and a map component of landmark images appearing in the map image.

15. A client according to claim 14, wherein said map data includes, as said map components, road data for drawing a road, polygon data for drawing a construction, and character string data for drawing a character string.

16. A client according to claim 14, further comprising storage means, wherein when specified data are stored in said storage means, a signal can be sent to the server so that the server does not send the same data.

17. A client according to claim 14, wherein said user interface, said main thread, and said drawing thread cooperate so that processing for input from a user, processing for retrieving the map data from the server, and processing for drawing the map image are performed in parallel.

18. A client according to claim 14, wherein said drawing thread includes a drawing queue for storing a drawing request added by said main thread according to the map component.

* * * * *